Feb. 16, 1937.   M. WAGNER   2,070,817
SPRINGING ARRANGEMENT FOR THE WHEELS OF VEHICLES
Filed Dec. 31, 1935

Inventor
Max Wagner
by A. A. Hicke
Attorney

Patented Feb. 16, 1937

2,070,817

UNITED STATES PATENT OFFICE 2,070,817

SPRINGING ARRANGEMENT FOR THE WHEELS OF VEHICLES

Max Wagner, Stuttgart, Germany, assignor to Daimler Benz Aktiengesellschaft, Stuttgart-Unterturkheim, Germany, a German company Application December 31, 1935, Serial No. 56,915
In Germany December 17, 1934

18 Claims. (Cl. 267—20)

This invention relates to an improved spring arrangement for the wheels of a vehicle and in particular to elastic springing means. It is a continuation-in-part of my application Serial No. 704,179, filed December 27, 1933, which has matured into Patent No. 2,039,670, issued May 5, 1936.

An object of this invention is the provision of novel springing means for vehicle wheel supports.

Another object of this invention is the provision of elastic springing means particularly for steered wheels.

A further object of this invention is the provision of elastic springing means for wheel supports used in addition to and in conjunction with known springing arrangements.

Figure 1:
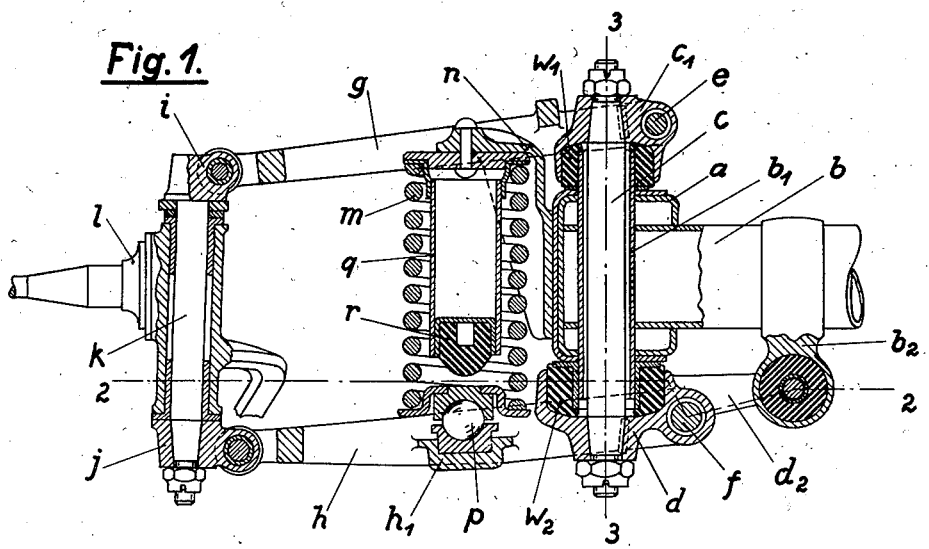
Figure 2:
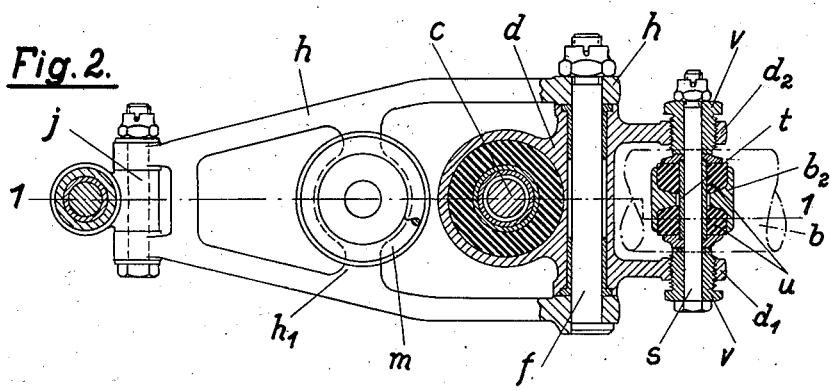
Figure 3:
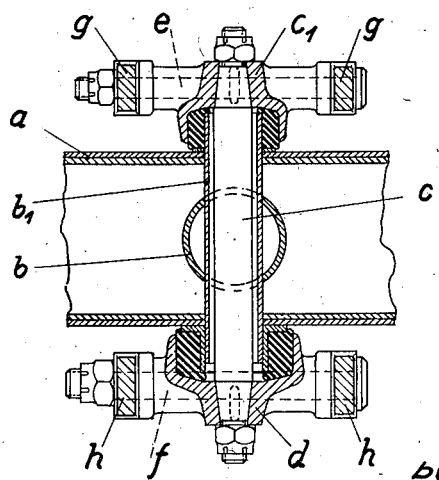

These and other objects of the invention will be best understood and appreciated from the following description of an embodiment thereof, described for purposes of illustration and shown in the accompanying drawing in which:

Fig. 1 is a front view of a preferred embodiment of the invention shown partially in cross-section and taken along the line 1—1 of Fig. 2; and Fig. 2 is a plan view, partially in cross-section, taken along the line 2—2 of Fig. 1; and Fig. 3 is a cross-sectional view of a detail illustrating this invention taken along the line 3—3 of Fig. 1.

This invention, as illustrated in the drawing, includes a longitudinal frame member $a$, a transverse member $b$ rigidly connected therewith, and a member $b_1$ illustrated as a tubular member which may extend vertically through the longitudinal frame member and is rigidly fixed thereto, and through which an intermediate member $c$ extends. As shown in the drawing, there may be clearance between the intermediate member $c$ and the tubular member $b_1$. At either end of the intermediate member $c$ are placed elements $c_1$ and $d$, shown as socket-shaped supporting bracket members which are held against axial displacement by any suitable means, such as the nuts shown. These bracket members $c_1$ and $d$ are shown firmly attached to the intermediate member against relative rotation by suitable means, such as a key.

Intermediate bracket members $c_1$ and $d$ and longitudinal frame member $a$ are respectively placed yielding or buffer members $w_1$ and $w_2$, illustrated as rubber rings. The lower pivot member $d$ is separately connected to the frame through arms $d_1$ and $d_2$, joining means such as a bolt $s$, further resilient means $u$ and a frame member $b_2$. The effective resiliency of this connection may be varied by means of adjustable bearings $v$.

Pivotally connected to the bracket members $c_1$ and $d$ are links $g$ and $h$ which, in turn, by means of such as supporting bracket members $i$ and $j$ and a further intermediate member $k$, are connected to a wheel carrier $l$; illustrated here as a stub axle. The intermediate members $c$ and $k$ and links $g$ and $h$ together with their connecting means, form a parallelogram whereby a wheel on carrier $l$ may be moved up and down vertically relative to the frame in a vertical plane.

The improved operation of the present invention results from the resilient means $w_1$ and $w_2$. The remaining apparatus is substantially the same as that illustrated in my United States Patent No. 2,039,670, in which the wheel is elastically mounted through a corresponding intermediate member $c$ by means of the resilient means illustrated in this application as $u$. By providing in addition the resilient elements $w_1$ and $w_2$, further and supplemental springing is provided. This results in several advantages. Jolts on the intermediate connected member $c$ are absorbed to a great extent by the members $w_1$ and $w_2$, thus preventing destructive stresses upon the several members of the support. Furthermore, transverse jolts directed upon the wheel as for example when striking a curb or going around a curve, are absorbed to a large extent, as are also the stresses due to the driving and braking moments acting upon wheels. Thus, said members $w_1$ and $w_2$ serve to cushion jolts from all directions, vertical, transverse and/or longitudinal.

The operation of the other elements shown in connection with my improvement, such as the function of the helical spring $m$ together with its supporting and auxiliary elements $h$, $n$, $q$, and $r$, is fully described and disclosed in my aforementioned United States patent.

It is to be understood that my invention is not limited to the embodiment here shown. For example, my resilient springing means may be used in any connection where its function is of utility. Any resilient material of suitable characteristics can be used for the buffers $w_1$ and $w_2$.

Furthermore, the terms "frame" or "chassis" as herein used are not to be understood as limited to such devices when formed separate from the body or coachwork of the vehicle, but as including such devices when forming a part of or intimately interconnected with such body or coachwork.

It will be seen therefore that I have provided a device which fulfills the objects primarily stated, and while I have shown a single embodiment of my invention it is clear that other forms thereof may readily be provided without departing from my invention as defined in the following claims:

1. In a power-driven vehicle a frame, a vehicle wheel, a swinging axle for supporting the wheel and capable of motion in a vertical plane, a vertical intermediate member for connecting the swinging axle to the frame and elastic means coaxial with said intermediate member interposed between the intermediate member and the frame for allowing a limited motion of the swinging axle in a horizontal plane.

2. In a power-driven vehicle a frame, a vehicle wheel, a swinging axle for supporting the wheel and capable of motion in a vertical plane, a vertical intermediate member for connecting the swinging axle to the frame and rubber rings coaxial with said intermediate member interposed between the intermediate member and the frame for allowing a limited motion of the swinging axle in a horizontal plane.

3. In a power-driven vehicle a frame, a vehicle wheel, a swinging axle for supporting the wheel and capable of motion in a vertical plane, a vertical intermediate member for connecting the swinging axle to the frame, cupped end pieces on the ends of the intermediate member and rubber rings bearing against the inside of the cupped end pieces for allowing a limited motion of the swinging axle in a horizontal plane.

4. In a power-driven vehicle a frame, a vehicle wheel, a swinging axle for supporting the wheel and capable of motion in a vertical plane, a vertical intermediate member for connecting the swinging axle to the frame, cupped end pieces on the ends of the intermediate member supporting the swinging axle and rubber rings bearing against the inside of the cupped end pieces for allowing a limited motion of the swinging axle in a horizontal plane.

5. In a power-driven vehicle a frame, a vehicle wheel, a swinging axle for supporting the wheel and capable of motion in a vertical plane, a vertical intermediate member for connecting the swinging axle to the frame, a tubular member surrounding the intermediate member with clearance, cupped end pieces on the ends of the intermediate member and rubber rings interposed between the cupped end pieces and the ends of the tubular member for allowing a limited motion of the swinging axle in a horizontal plane.

6. In a power-driven vehicle a frame, a vehicle wheel, a swinging axle for supporting the wheel and capable of motion in a vertical plane, a vertical intermediate member for connecting the swinging axle to the frame, extending vertically through a member of the frame, and elastic means interposed between the intermediate member and the frame above and below the frame member for allowing a limited motion of the swinging axle in a horizontal plane.

7. In a power-driven vehicle a frame, a vehicle wheel, a swinging axle for supporting the wheel and capable of motion in a vertical plane, a vertical intermediate member for connecting the swinging axle to the frame, extending vertically through a longitudinal member of the frame, and elastic means interposed between the intermediate member and the frame above and below the frame member for allowing a limited motion of the swinging axle in a horizontal plane.

8. In a power-driven vehicle, a frame, a vehicle wheel, a guiding element for the wheel for connecting the wheel with the frame in such a manner that the wheel can swing in a vertical plane relative to the frame, an intermediate member for pivotally connecting the guiding element with the frame having a substantially vertical axis in such a manner that the guiding element can turn about the vertical axis of the intermediate member and elastic buffers co-axial with said vertical axis and journaling said intermediate member, and further elastic buffers eccentrically arranged with respect to said vertical axis and elastically limiting the turning movement of said intermediate member about said vertical axis.

9. In a power driven vehicle, the combination as set forth in claim 1 with yielding suspension means for springing the wheel with respect to the frame in the vertical direction.

10. In a power driven vehicle, a vehicle wheel, a frame, a swinging axle for supporting the wheel and capable of motion in a vertical plane, a vertical intermediate member for connecting the swinging axle to the frame, and elastic means co-axial with said intermediate member interposed between the intermediate member and the frame for allowing a limited motion of the swinging axle in a horizontal plane, and further means for connecting said intermediate member to said frame comprising a second elastic means for limiting the motion of said intermediate member about a vertical axis.

11. The combination according to claim 10 in which said elastic means are made of rubber.

12. In a power driven vehicle, a frame, a vehicle wheel, a swinging axle for supporting the wheel and capable of motion in a vertical plane, a generally vertical intermediate member for connecting the swinging axle to the frame, and elastic means interposed between the intermediate member and the frame for allowing a limited motion to the swinging axle in a horizontal plane, and for preventing metallic contact between said intermediate member and said frame.

13. The combination according to claim 12 including additional means for connecting said intermediate member to said frame comprising second elastic means for limiting the motion of said intermediate member about a vertical axis.

14. The combination according to claim 12 in which said elastic means are made of rubber.

15. In a vehicle having a frame, in combination, a wheel, an intermediate member journaled in said frame, wheel supporting means fastened to said intermediate member, elastic means co-axial with said intermediate member interposed between said wheel supporting means and said frame, and further elastic means for joining said wheel supporting means to said frame.

16. In a vehicle having a frame, in combination, a wheel, an intermediate member journaled in said frame, wheel supporting means comprising a pair of superimposed links pivotally connected respectively to opposite ends of said intermediate member, elastic means co-axial with said intermediate member positioned between said wheel supporting means and said frame, and further elastic means for joining said wheel supporting means to said frame.

17. The combination according to claim 16 including means on one of said links for limiting the vertical movement of said wheel.

18. In a power driven vehicle, a frame member, a vehicle wheel, swinging axle means for supporting the wheel and capable of motion in a vertical plane, means for joining said axle means to said frame member, and elastic means above and below said frame member interposed between the said joining means and said frame.

MAX WAGNER.